July 19, 1949. E. E. LIBMAN 2,476,746
DIRECTOR FOR COMPUTING TORPEDO ATTACK COURSES
Filed Jan. 15, 1947 3 Sheets-Sheet 3

INVENTOR.
Earl E. Libman,
BY
Edward L. Mueller
ATTORNEY

Patented July 19, 1949

2,476,746

UNITED STATES PATENT OFFICE 2,476,746

DIRECTOR FOR COMPUTING TORPEDO ATTACK COURSES

Earl E. Libman, Brooklyn, N. Y., assignor to Control Instrument Company, Inc., Brooklyn, N. Y., a corporation of New York Application January 15, 1947, Serial No. 722,143

6 Claims. (Cl. 235—61.5)

This invention relates to improvements in torpedo control systems and has particular reference to a director for computing the values of the factors involved in firing a torpedo in line with the fore and aft axis of a ship and the point of intercept with a target.

An object of the invention is to provide an improved system of comparatively simple and practical construction wherein the factors of relative target bearing and bearing rate are utilized to give an indication of the torpedo collision course to be followed by a firing ship.

Another object of the invention is to provide a system for determining the course of a ship required with respect to the collision course of a torpedo fired thereby, by resolving the various factors required for such a determination electrically, and then, utilizing a series of potentiometers which coact in novel fashion with the electrical data furnished, to compute a voltage which, in terms of an output voltage whose magnitude and instantaneous polarity as compared with a reference voltage, is a function of the error in the required ship's course, and finally to position an indicator in accordance with that error.

The inventive idea involved is capable of receiving a variety of expressions, one of which, for purpose of illustration, is shown in the accompanying drawings; but it is to be expressly understood that said drawings are employed merely to facilitate the description of the invention as a whole and not to define the limits thereof, reference being had to the appended claims for this purpose.

Figure 1:
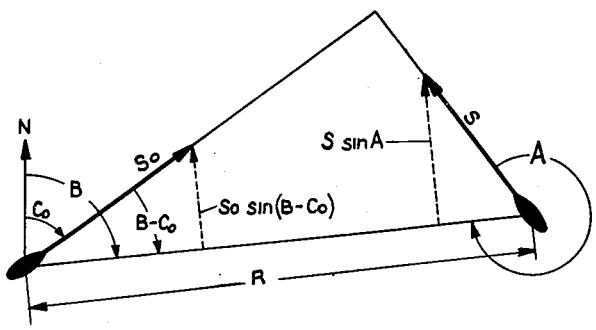
Figs. 1 and 2 are geometrical diagrams illustrating the relationship of the factors involved in solving the problem.
Figure 2:
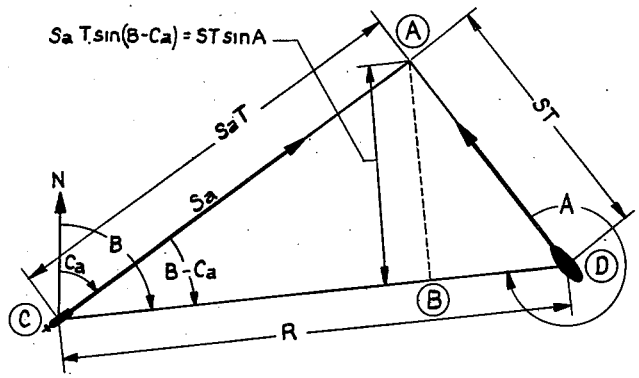

The solution of the problem of firing a torpedo whose tube is fixed and in line with the fore and aft axis of the ship, is based upon the concepts shown in Figs. 1 and 2. In Fig. 1, it is assumed the own ship is traveling at a speed of $So$ knots. The position of the target relative to own ship is indicated by the difference between the target bearing $B$ and own ship's course $Co$ ($B-Co$), and the present range $R$. The target is proceeding at a speed of $S$ knots and its target angle is $A$. For convenience, the time derivative of a function $$\frac{d}{dt}(f)$$

is written as $d(f)$. By resolving the speeds of own ship and target into components along the line of sight and perpendicular to this line, the difference between the perpendicular components will give the linear bearing rate $RdB$ which may be expressed in the following equation:

(I) $\quad R \cdot dB = So \cdot \sin(B-Co) - S \cdot \sin A$

Fig. 2 shows the torpedo traveling at a speed of $Sa$ knots on the course $Ca$ so as to collide, after $T$ seconds, with the target which is proceeding at a speed of $S$ knots at target angle $A$. From Fig. 2, it is apparent that, in triangle ABC, $$\overline{AB} = Sa \cdot T \cdot \sin(B-Ca)$$

and in triangle ABD, $$AB = S \cdot T \cdot \sin A$$

and thus $$Sa \cdot T \cdot \sin(B-Ca) = S \cdot T \cdot \sin A$$

from which is obtained the equation:

(II) $\quad Sa \cdot \sin(B-Ca) = S \cdot \sin A$

By substituting Equation II in Equation I, $S \sin A$ is eliminated and there is obtained a relation between the actual course, $Co$, of own ship and the course, $Ca$, which the ship should follow if a torpedo launched from it is to strike the target. Substituting (III) $\quad Rdb - So \sin(B-Co) = Sa \sin(B-Ca)$ Now by adding the same quantity to both sides of the equation we may change the form without altering values and choosing the expression $$So \sin(B-Ca) = So \sin(B-Ca)$$

we may obtain Equation III as $Rdb - So(\sin B-Co) - So \sin(B-Ca) =$
$\quad So \sin(B-Ca) - Sa(B-Ca)$ Simplifying and rearranging terms, this becomes (IV) $\quad Rdb = [So-Sa][\sin B-Ca] +$
$\quad So[\sin(B-Co) - \sin(B-Ca)]$ Now, if a torpedo launched from own ship is to strike the target, the ship must follow a course, $Ca$, such that $Co = Ca$.

When own ship is on the proper course to obtain a hit, the expression $$So \cdot [\sin(B-Co) - \sin(B-Ca)]$$

becomes equal to zero and, in order to obtain a hit, Equation IV must become:

$$R \cdot dB = (So - Sa) \cdot \sin(B-Ca)$$

Rearranging and substituting Co for Ca results in the equation:

(V) $\quad R \cdot dB - (So - Sa) \cdot \sin(B-Co) = 0$

If, therefore, the above quantity is transmitted to a right-left indicator in view of the helmsman, he may change course until said indicator reads zero and thereby place the ship upon a torpedo collision course with the target.

Figure 3:
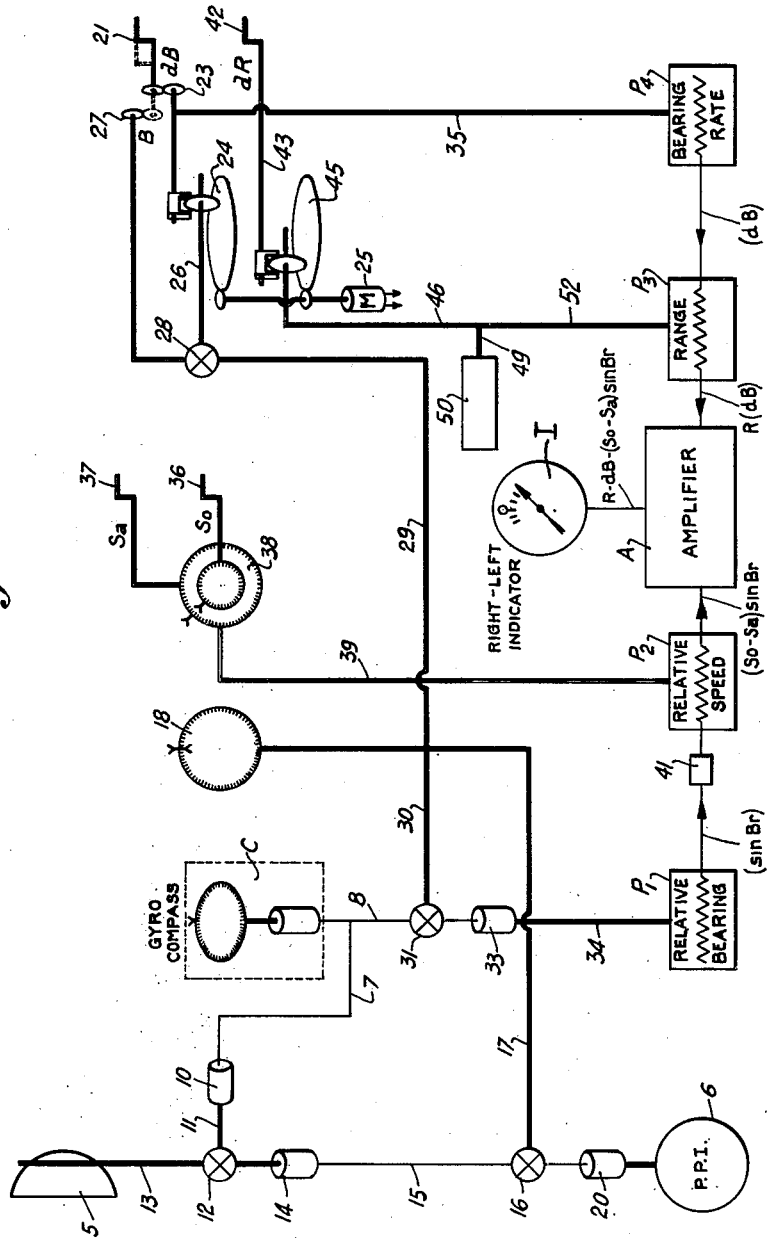
Fig. 3 is a schematic view showing the various functions of the system.
Figure 4:
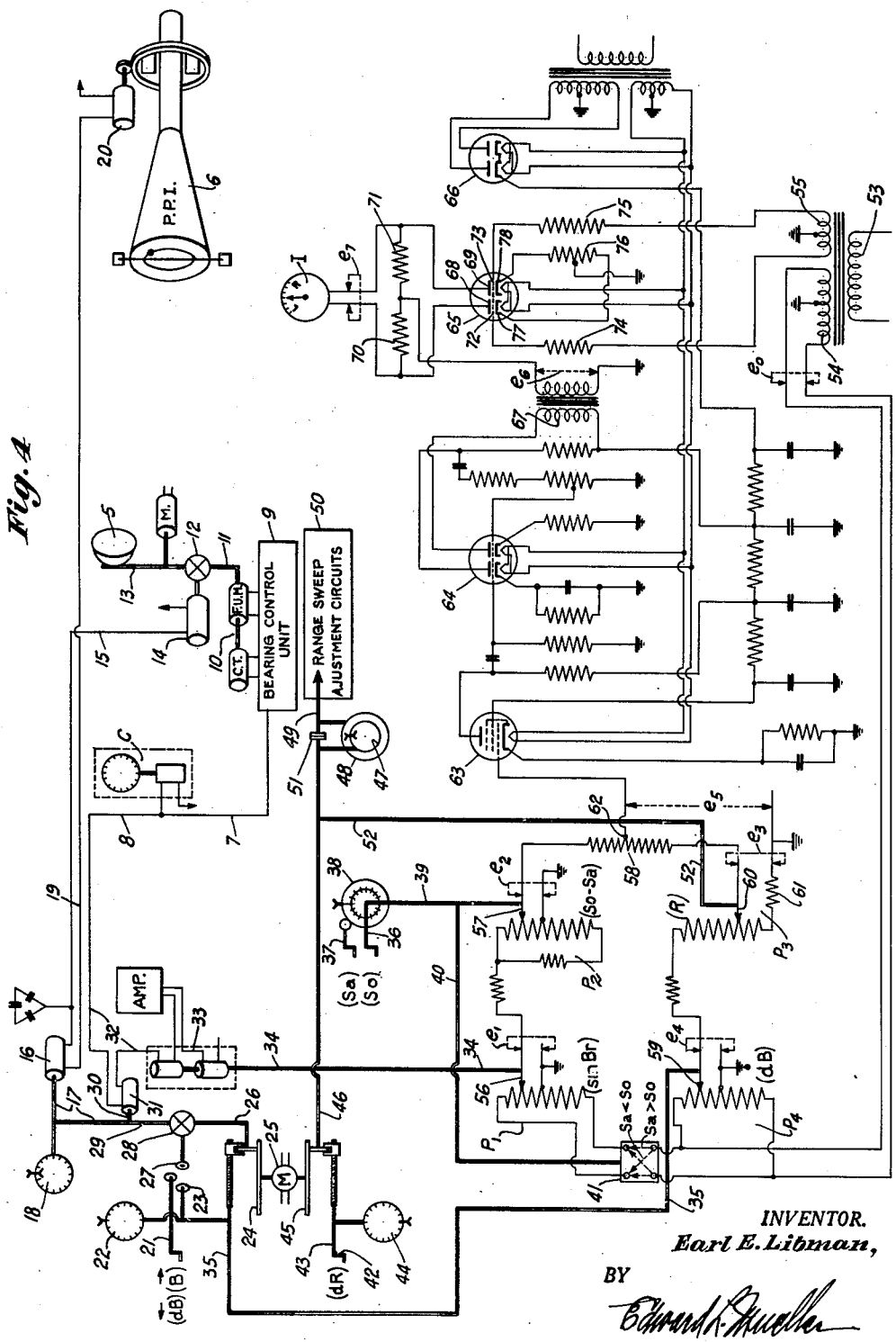
Fig. 4 is a diagrammatic view of the control system in detail.

The system for computing the fire control problem, as exemplified in Figs. 3 and 4, includes the introduction thereinto of the components of own ship speed So, torpedo speed Sa, range rate dR, true target bearing B, and true target bearing rate dB, all of which combine to control a series of variable electrical networks such as four potentiometers conventionally shown at P1, P2, P3 and P4 in Fig. 3. The inputs of these potentiometers are, respectively, relative bearing Br, difference between torpedo and own ship speeds, range rate and bearing rate. The combined output of said potentiometers is proportional to $R \cdot dB - (So - Sa) \cdot \sin Br$, where Br is equal to (B—Co) hereinabove described and is fed into the amplifying unit generally indicated by A in Fig. 3, where it is amplified and rectified to operate the right-left indicator I.

In connection with the computing circuit illustrated in detail in Fig. 4, any suitable means may be employed for ascertaining the factors of range rate and bearing rate of the target with respect to own ship. For illustrative purposes, such means is conventionally shown as a range and direction indicating system consisting essentially of a sweep antenna 5 driven by the motor M, and a plan position indicator 6 of known construction which is employed in the usual manner as a zero reader to indicate the range and direction relative to own ship's course.

Associated with the detection system, which indicates the relative bearing Br, is a slave gyro compass, conventionally shown at C, for indicating own ship's course Co, and the sum of the two angles thus evolved is the true target bearing B. Own ship's course is electrically transmitted over the conductors 7 and 8, the former of which is connected, through the bearing control unit conventionally shown at 9, to the follow-up unit 10 consisting of a control transformer CT and a follow-up motor FUM. Here the intelligence is converted to a mechanical indication on the shaft 11 connected to the differential 12 where it is combined with the antenna or relative target bearing transmitted by the shaft 13. The mechanical output of said differential 12 is converted, by the synchro transmitter 14, to an electrical indication which is transmitted over the conductor 15 to the differential synchro generator 16. The shaft 17 of this generator is positioned, as will presently be described, in accordance with the generated true target bearing B and is connected to the dial 18 for indicating said bearing. The electrical output of said generator appearing in the conductor 19 is the difference between the generated and observed bearing. Said output controls the synchro motor 20 which, in turn, positions the indicator unit 6, observation of which enables the operator to set in the bearing B and bearing rate dB through the medium of the adjustable crank shaft 21. A dial 22 is controlled by the shaft 21 for indicating the bearing rate. Rotation of said crank shaft, while connected to the gear 23, controls an integrator 24 driven at a constant speed by the motor 25. The output to the shaft 26 of said integrator represents the angular rotation of the wheel thereof and is the integral of the angular position of the shaft 21. Observed bearing is set in by engaging the gear of the shaft 21 with the gear 27 which is operatively connected to the differential 28 to which the shaft 26 is also joined. Therefore, the angular rotation of the output shaft 29 is representative of the generated true target bearing derived from the target bearing rate dB which is set in by the shaft 21 through the gear 23. The output of shaft 29 is supplied to the shaft 30 of the synchro differential generator 31 which electrically receives, over the conductor 8, the own ship's course from the compass C. The electrical output of said generator 31 is transmitted over the conductor 32 and, due to the subtractive action of said generator, said output is the generated relative bearing Br. This quantity is converted, by the follow-up unit 33, similar to the unit 10, to a mechanical output and is transmitted by the shaft 34 to the sinusoidal potentiometer P1. The quantity dB, in addition to being set in through the integrator 24, is also transmitted, through the shafting 35, to the linear potentiometer P4.

By means external to the computer, the components of own ship's speed So and torpedo speed Sa are determined and then fed into the computer by the handcranks 36 and 37, respectively, and are subtracted in the differential 38, the result being mechanically transmitted to the linear potentiometer P2 through the shaft 39. This shaft is connected to another shaft 40 which controls a reversing switch conventionally indicated at 41 to properly position its switch arms depending upon whether own ship's speed is greater or less than the torpedo speed.

The final component to be fed to the computer is that of range rate. The operator receives his indication of range from the radar system and, through the handcrank 42 connected to the shaft 43 which is coupled to a rate indicating dial 44, feeds in the range rate to control the disc integrator 45 operated by the motor 25 at a constant speed. The output shaft 46 of said integrator operates the inner dial 47 of a range synchronizing device, the outer ring dial 48 of which is automatically controlled, through the shaft 49, from a control unit conventionally shown at 50 and embodying well known range sweep adjustment circuits. When the index of the operator-controlled dial 47 matches that of the dial 48, with the radar range somewhere within the operating limits of the computer, a conventional clutch device shown at 51 is operated to couple the shafts 46 and 49 together, after which the angular output of the shaft 46 controls the shaft 49. The output of shaft 46 is also transmitted through the shaft 52, to the linear potentiometer P3.

The various inputs to the computing circuit shown in Fig. 4 having now been established, a detailed description of said circuit will follow. The primary 53 of a supply transformer has two secondaries 54 and 55, both of which are center-tapped to ground. The total voltage developed across the winding 54, indicated as $e_0$, is applied simultaneously to the potentiometers P1 and P4. Potentiometer P1, the midpoint of the winding of which is also grounded, is wound in such manner that the resistance from said midpoint to any point on the winding is proportional to the sine of the angle through which the movable terminal 56 must rotate in order to move the distance between said points. Said terminal 56 is positioned by the shaft 34 which, being rotated through an angle proportional to the relative target bearing $Br$, therefore moves said terminal through an angle likewise proportional to said quantity. The electrical output between said grounded midpoint of the terminal 56 is proportional to the voltage $e_0$ applied to the potentiometer P1 through the contacts of the reversible switch 41 and to the sine of the relative target bearing, which may be represented as $e_1 = e_0 \sin Br$. This voltage $e_1$ is then applied to the winding of the potentiometer P2 whose midpoint is connected to ground and which, being linearly wound, has a resistance which is proportional to the angular position of its movable terminal 57 and the shaft 39 that controls the latter. The rotation of said shaft being proportional to the difference between own ship's speed $So$ and torpedo speed $Sa$, the electrical output of potentiometer P2 is, therefore, $e_2 = e_1 (So-Sa) = e_0 \sin Br (So-Sa)$. This voltage $e_2$ is connected to the mixing resistor 58 or its equivalent.

As previously stated, the voltage $e_0$ is also applied to the potentiometer P4 whose winding is linear, with the midpoint thereof grounded, and whose movable terminal 59, controlled by the shaft 35, moves through an angle which is proportional to the true bearing rate $dB$. Consequently, the output voltage $e_4$ is equal to $e_0 dB$. This voltage is applied to the input of the potentiometer P3 which also has a linear winding, with its movable terminal 60 positioned by the shaft 52 whose rotation is proportional to range R. By means of the resistor 61, the winding of potentiometer P3 is placed sufficiently above ground potential to permit the terminal 60 to indicate predetermined minimum and maximum values of range. The output voltage $e_3$ is, therefore, represented by $e_4 R = e_0 R dB$ and said voltage $e_3$ is also applied to the mixing resistor 58.

The point 62 of said resistor 58 is connected to the input grid of a three-stage resistance coupled amplifier consisting of the vacuum tubes 63, 64, the dual triode 65 and the rectifier tube 66. The action of the resistor 58 is such that the output of potentiometer P2 is subtracted from the output potentiometer P3, thus giving the output voltage, $e_5 = e_3 - e_2 = RdB - (So-Sa) \sin Br$. Said voltage then passes through three stages of amplification in the tubes 63 and 64 and the output of the latter is fed to the transformer 67 whose voltage output is represented by $e_6$ and equals $Ke_5$, where K is the gain of the amplifier. This voltage is then applied to the plates 68 and 69 of the triode 65 through equal load resistors 70 and 71, and the grids 72, 73 of said triode are excited from the transformer winding 55 through equal current limiting resistors 74, 75, so that the voltage applied to the grid 72 is equal in magnitude and opposite in sign from the voltage applied to the other grid 73. The potentiometer 76 applies cathode bias to the cathodes 77, 78 of the triode and serves to reduce the voltage $e_7$ between the plates 68, 69 to 0 when $e_6$ is 0.

The voltage output $e_7$ is applied to the coil of a zero-center galvanometer which is used as the right-left indicator I. If the output $e_3$ is larger than the output $e_2$, then the output $e_5$ of the mixing resistor will be of one instantaneous polarity, and therefore, the output $e_6$ will be of similar instantaneous polarity. At a given instant, positive plate voltage will be applied to both plates 68, 69 simultaneously. However, as above mentioned, alternating voltages will be applied to the grids 72, 73 causing the tubes to draw current if plates and grids are positive simultaneously. Assuming a condition in which the instantaneous polarity of the secondary winding 55 is such that the grid 72 becomes positive and that of the grid 73 is negative, when the voltage $e_6$ is positive, the electron flow from the cathodes 77 to the plate 68 is greater than that between the cathodes 78 and plate 69. Therefore, the potential drop across the resistor 70 will exceed that across the resistor 71, and the voltage $e_7$ will be positive, thus causing a positive deflection of the indicator I during the half cycle that the voltage $e_6$ is positive. During the next half cycle, both plates 68 and 69 are simultaneously negative resulting in no conduction whatever and, consequently, voltage $e_7$ is 0 for one-half cycle. The above procedure is repeated indefinitely as long as the voltage $e_5$ does not change in instantaneous polarity with respect to the voltage of transformer secondary 55. The resulting average over a full cycle is an average positive deflection of the indicator I. From the foregoing, it is apparent that if voltage $e_5$ is of opposite instantaneous polarity with respect to the voltage of transformer secondary 55, there would be an interchange of action between the two sections of the triode 65 and the sign of the voltage $e_7$ would likewise be changed, since the grid 73 would now be positive and the grid 72 negative when the plates 68, 69 are positive. Hence, for 180° phase reversals of the voltage $e_5$, negative deflections of the indicator I are obtained. By observing the deflections of the indicator, the ship can be steered on such a course that the indicator reading is kept at 0. When in this condition, the voltage $e_5$ is 0, as above described, and the torpedo may be launched.

What is claimed is:

1. In a director for use in firing a torpedo on a target collision course in line with the fore and aft axis of a ship, input means settable in accordance with ship's speed, torpedo speed, line of sight target range, and true target bearing, differential means for combining ship's speed and torpedo speed, computing means coacting with said input means to determine target range rate and target bearing rate, a compass, differential means for combining true target bearing, target bearing rate and true compass course to obtain relative bearing, a reference voltage, a series of interconnected potentiometers connected thereto and responsive to the difference between ship's speed and torpedo speed, range input, and computed bearing rate, range rate, and relative bearing respectively to produce a combined electrical output voltage whose amplitude and polarity, when compared with said reference voltage, is variable in accordance with the variations in the aforesaid factors, and means responsive to said voltage output for indicating the variation of magnitude and polarity thereof as functions of existing error in the desired collision course.

2. In a director for use in firing a torpedo on a target collision course in line with the fore and aft axis of a ship, input means for ship's own speed and torpedo speed, differential means coacting with said input means to give the relative velocity of the torpedo with respect to the ship, a gyro-compass, input means for range, target bearing, and ship's own course, computing means coacting with said gyro-compass, and target bearing to determine relative bearing and the rate of change thereof, computing means coacting with said input means of range to determine the rate of change thereof, a reference voltage source, a series of interconnected potentiometers, means responsive to said differential means, range input and calculated bearing rate and relative bearing for setting said potentiometers, a mixing resistor connected to the outputs of two of said potentiometers and coacting therewith so that the voltage thereacross varies in magnitude and polarity in accordance with the combined outputs of all of said potentiometers, and means coupled to said resistor to indicate variations in the magnitude and polarity of said voltage as a function of existing errors in the required collision course.

3. In a director for use in firing a torpedo on a target collision course in line with the fore and aft axis of a ship, input means responsive to ship's own speed and to torpedo speed, means for computing the difference between torpedo and ship speeds, input means responsive to range between ship and target along the line of sight, means to compute the rate of change of said range, means including an input element for introducing true target bearing and the rate of change thereof, a gyro-compass, differential means for combining said bearing, its rate of change and the compass bearing to obtain relative target bearing, a series of interconnected potentiometers settable in accordance with said torpedo and ship speed differential, range, bearing rate, and relative bearing, a voltage source therefor, means for combining the outputs of said relative bearing and speed potentiometers, and of said bearing rate and range potentiometers said means having an output voltage whose amplitude and polarity are variable in accordance with the combined inputs to said potentiometers, and means controlled by said combining means for indicating variations in the magnitude and polarity of its output, as a function of an existing error in said collision course.

4. In a director for use in firing a torpedo on a target collision course in line with the fore and aft axis of a ship, input means responsive to ship's own speed and to torpedo speed, means for determining the difference between torpedo and ship speeds, input means of range between ship and target along the line of sight, means to compute the rate of change of said range, means including a gyro-compass and an input element for introducing true bearing and the rate of change thereof, differential means for combining said compass indication, bearing and its rate of change to obtain relative bearing, a sinusoidal potentiometer settable in accordance with said relative bearing, linear potentiometers settable in accordance with said speed differential, range and bearing rate, a reference voltage source, a mixing resistor connected to said range and speed potentiometers and having a voltage whose magnitude and polarity vary as a function of the combined outputs of said potentiometers, a ship's course indicator, and means to position said indicator in accordance with variations in said voltage.

5. In a director for use in firing a torpedo on a target collision course in line with the fore and aft axis of a ship, input means responsive to ship's own speed and torpedo speed, means for computing the difference between torpedo and ship speeds, input means responsive to range between ship and target along the line of sight, means to compute the rate of change of said range, means including a gyro-compass and an input element for introducing true bearing, means for computing the rate of change thereof, differential means for combining said gyro-compass output with said bearing and its rate of change to obtain relative bearing, a series of interconnected potentiometers settable in accordance with said torpedo and ship speed difference, range, bearing rate, and relative bearing, a voltage source therefor, a mixing resistor, a reversing switch connecting said voltage source and said relative bearing potentiometer and controlled by said mixing resistor connected to said speed and range potentiometers and having an output voltage whose amplitude and phase are variable in accordance with the combined outputs of said potentiometers, and a ship's course indicator controlled by the variations in said output voltage to indicate error in the collision course.

6. In a director for use in firing a torpedo on a target collision course in line with the fore and aft axis of a ship, input means responsive to ship's own speed and to torpedo speed, differential means for determining the difference between torpedo and ship speeds, input means responsive to range between ship and target along the line of sight, computing means responsive to said input means for determining the rate of change of said range, means including a gyro-compass and an input element for introducing true target bearing, means for computing the rate of change of target bearing, differential means for combining said compass indication, bearing and its rate of change to obtain relative bearing, a source of current, relative bearing and bearing rate potentiometers connected to said source, and controlled by said differential means, a relative speed potentiometer coupled to said relative bearing potentiometer for receiving its output and controlled by the first named means, a range potentiometer coupled to said bearing rate potentiometer for receiving its output and controlled by the third named means, a mixing resistor connected to said speed and range potentiometers, and having a voltage output whose amplitude and instantaneous polarity vary in accordance with the combined outputs of all of said potentiometers, and means coupled to said resistor to indicate variations in the magnitude and polarity of its voltage output as functions of any existing error in said collision course.

EARL E. LIBMAN.

REFERENCES CITED

The following references are of record in the file of this patent:

UNITED STATES PATENTS

| Number | Name | Date |
|---|---|---|
| 1,423,168 | Techel | July 18, 1922 |
| 1,584,182 | Methlin | May 11, 1926 |
| 1,943,403 | Watson | Jan. 16, 1934 |
| 2,391,357 | Sperry | Dec. 18, 1945 |